United States Patent Office 3,323,701
Patented June 6, 1967

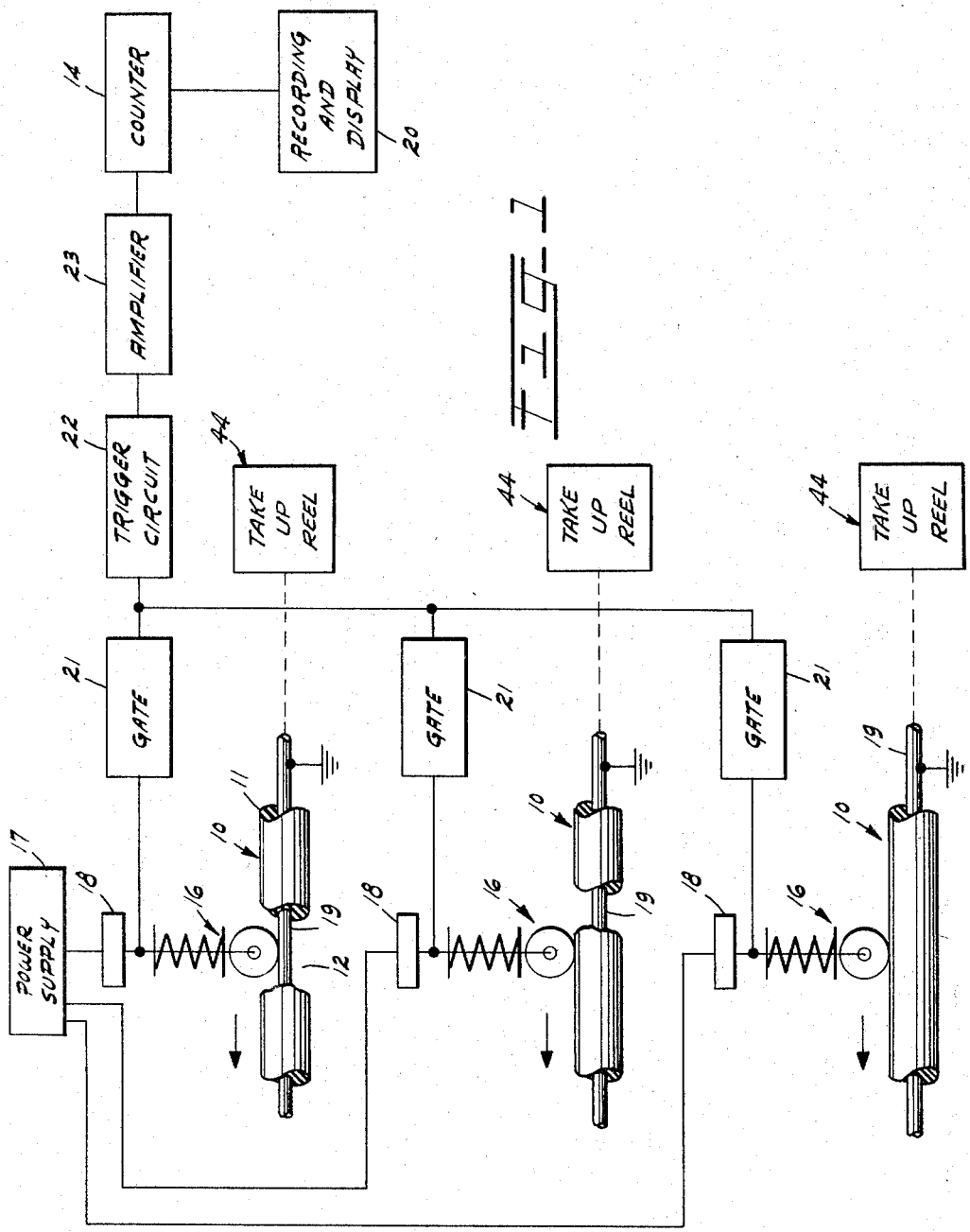

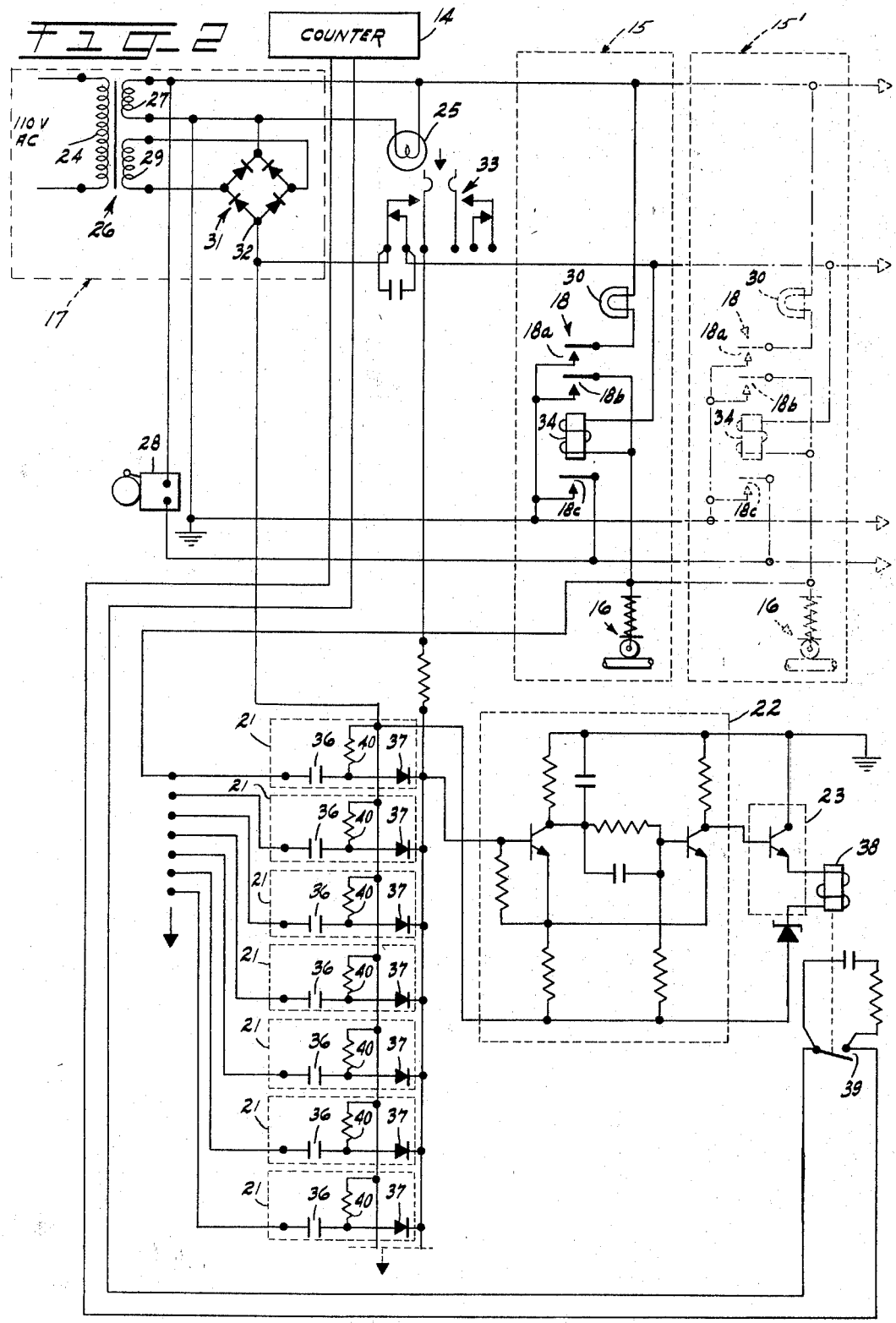

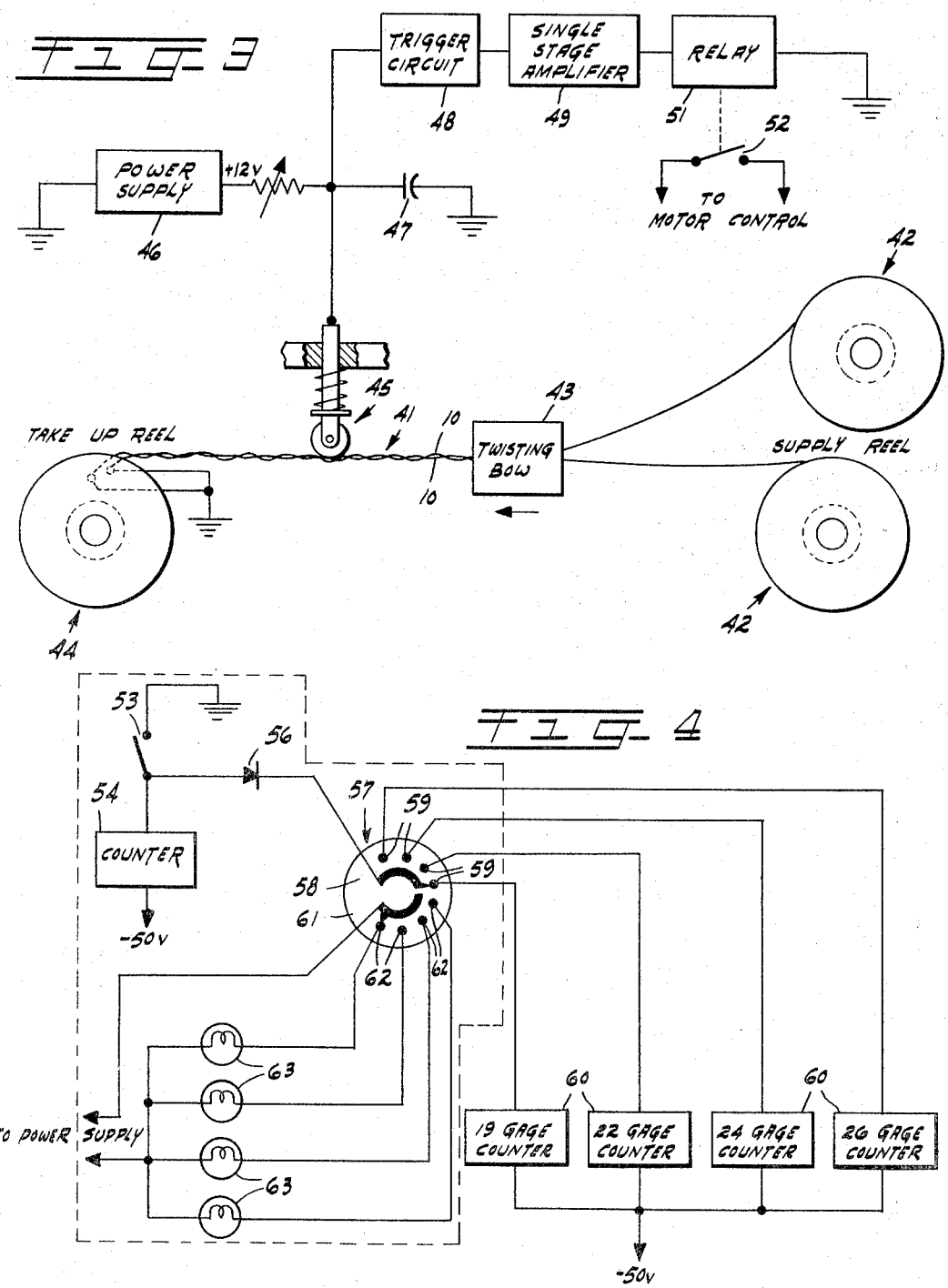

3,323,701
APPARATUS FOR DETECTING AND COUNTING DEFECTS IN A PLURALITY OF INSULATED CONDUCTORS
Edward P. Gurski, Cranford, and Theodore L. Hordosi, Berkeley Heights, N.J., assignors to Western Electric Company, Incorporated, New York, N.Y., a corporation of New York
Filed Apr. 21, 1965, Ser. No. 449,822
6 Claims. (Cl. 226—43)

This invention relates to detecting apparatus and particularly to an apparatus for detecting and counting defects in conductor insulation.

A conventional quality control procedure used in the manufacture of insulated conductors involves counting the numbers of insulation defects occurring in a plurality of conductors as they emerge from an insulating machine wherein corrective action is taken when the number of defects exceed a certain tolerable minimum. The relatively large number of conductors which are simultaneously insulated by a single machine complicates the problem of detecting and recording defects. A typical pulp insulating machine, for example, applies an insulating covering pulp simultaneously about approximately sixty bare conductors. In many instances, a large number of machines are used and as consequence a large number of detectors and counters would be required to monitor the individual conductors for insulation defects.

In order to minimize the cost of detecting apparatus, the present invention proposes a single defect counter for receiving an input from a plurality of probes which monitor the individual wire conductors. The alternative of a separate counter for each probe would prove too costly and cumbersome for this particular application. However, where a single counter is used to record insulation defects on a plurality of conductors, there is the problem of recording a defect and then immediately having the counter available to record defects occurring on other conductors. A defect of long duration, such as a stretch of bare wire, would tend to hold up the counter and prevent counting of defects on other wires. Since a number of defects might then pass unnoticed, the accuracy of the quality control information obtained from the detector would be subjected to question.

Accordingly, an object of this invention is to provide an apparatus for detecting insulation defects occurring in a plurality of conductors and for recording the number of such defects on a single counting means.

Another object of this invention is to provide a detecting and counting apparatus for recording insulation defects of various types occurring in a plurality of pulp insulated conductors provided a short time interval exists between defects.

Another object of this invention is to provide an apparatus for detecting insulating defects occurring in any one of a plurality of conductors and recording the defect on a counter which becomes available for the next count almost immediately regardless of the length of the defect.

A more specific object of this invention is to provide a detecting and counting apparatus for counting the number of insulation defects occurring in the conductor output from a particular pulp insulating machine and means for totaling the number of defects by gauge size for a number of insulating machines.

In its broader aspect, the present invention contemplates a plurality of detectors, each monitoring an individual conductor for insulation defects and a gate circuit controlling the passage of detector output signals to a trigger circuit. A counter is connected to the output of the trigger circuit to register a defect when a detector signal activates the trigger circuit. Means are provided cuit so that the particular detector which operates drops in the gate circuit to control the input to the trigger circuit after a predetermined time interval to free the counter for recording defect signals from other detectors.

The present apparatus comprises a plurality of detectors, each including a roller contact, which continuously monitor the individual conductors of a group of insulated conductors for bare spot defects in the insulation and a gate circuit for feeding the defect signals to a Schmitt trigger circuit. The output of the trigger circuit is amplified and fed to a counter which records the defects. The gate circuits include a plurality of parallel circuits connected to the trigger circuit so than an insulation defect occurring in any of the pulp insulated wires causes the trigger circuit to fire and register the defect on the counter. In manufacturing facilities where a plurality of insulating machines are running different wire sizes, the defect signal may be fed both to a totalizing counter and to a counter which registers defects for a particular wire size.

If a defect is of long duration, for example, a long stretch of bare conductor, an initial detector pulse will discharge a capacitor in the corresponding gate circuit sending a signal to the trigger circuit. The capacitor remains discharged and no further pulses are generated despite the fact that the wire might still be void of insulation. A resistor circuit is coupled to each diode branch to reset the capacitor once the defect has been registered on the counter and the defect passes the roller. Thus, the trigger circuit is available for any number of pulses from any number of signal sources provided a short time interval exists between the defect signals.

Other objects and advantages will be apparent from the following detailed description when considered in conjunction with the accompanying drawings wherein:

FIG. 1 is a schematic block diagram illustrating the more important interacting circuits;

FIG. 2 shows a detailed circuit diagram of the invention;

FIG. 3 shows a circuit diagram of an alternate embodiment of the invention; and

FIG. 4 discloses a counting arrangement for recording the total number of insulation defects and the number of defects per wire gauge occurring in the output from a plurality of pulp insulating machines.

Referring now to the drawings, the invention is designed to monitor a plurality of insulated conductors 10 for defects in insulation 11 such as insulation voids 12. As shown in FIG. 1, the detecting and counting apparatus comprising the present invention includes a plurality of parallel detecting circuits, each responsive to insulation defects on a particular conductor 10. The defects signals from the various circuits are fed successively to a counter 14 where the information is totaled for quality control purposes. One application of the present apparatus is to monitor a plurality of conductors 10 which have been insulated by a single pulp insulating machine (not shown) or by a battery of such insulating machines.

In greater detail, each insulated conductor 10 is contacted by a spring-loaded roller 16 as it emerges with a coating of insulation 11 from an insulating machine. The conductors 10 are at ground potential while the roller is maintained at approximately −36 volts D.-C. by the power supply 17 through a lock-in relay 18. FIG. 1 shows three detecting circuits for purposes of illustration but in the normal instance about sixty conductors would be monitored by a single detecting apparatus. One of the conductors 10 is shown having a considerable length of bare wire 19, another conductor is shown as having an insulation defect during the same time interval as the first conductor and the third conductor is depicted as having a satisfactory covering of insulation 11. An important advantage of the present invention is being able to count defects which overlap provided there is a slight difference in the initial detection time of the defects.

Each detecting circuit includes a gate circuit 21, which is shown in detail in FIG. 2, in order to limit the duration of the defect signal when an insulation defect occurs on a particular conductor 10. The plurality of gate circuits 21 are connected to a trigger circuit 22 which fires when it receives a defect signal from any one of the gate circuits 21. The output from the trigger circuit 22 is fed to an amplifier 23 and the amplified pulse is then totaled on the counter 14. A recording and display arrangement 20 may be provided for the counter 14.

As shown in FIG. 2, a 110-volt A.-C. input is applied to the primary winding 24 of the transformer 26. The secondary winding 27 supplies a 24-volt A.-C. output to the alarm bell 28 which operates when a defect occurs on any one of the plurality of insulated conductors being monitored. The lamp 25 merely signifies a power-on condition. The secondary winding 29 is connected to the rectifier 31 in order to maintain the junction 32 at −36 volts D.-C. The negative output voltage from the rectifier 31 is connected through the non-locking reset key 33 to the winding 34 of the lock-in relay 18 and to the spring-loaded detector 16. Only one relay and detector circuit 15 is shown for purposes of illustration in FIG. 2 but it is to be understood that a plurality of such circuits exist represented by the circuit 15′ in phantom.

When a defect occurs on a conductor 10 the relay winding 34 is grounded through the conductor 10 causing the relay contacts 18a, 18b, and 18c to close. The alarm bell 28 sounds and the defect lamp 30 is lighted to signal the operator. The relay contacts 18a, 18b, and 18c remain closed until the operator pushes the key 33 breaking the circuit which operates the lock-in relay 18 and turning off the bell 28 and lamp 30. When the winding 34 of the locking relay 18 is grounded by a bare conductor, the corresponding capacitor 36 in the gate circuit 21 discharges sending a signal through the diode 37 to the Schmitt trigger circuit 22. The trigger circuit 22 fires transmitting a pulse indicative of a defect to the single stage amplifier 23 which provides an amplified output signal to operate the relay 38. Contacts 39 of the relay 38 close energizing a counter 14 to record the defect.

When the capacitor 36 has discharged, no further defect signals are received from a particular conductor although a considerable length of bare conductor 19 may exist and may still be in contact with the detector 16 because the associated capacitor 36 is held at ground potential by the bare conductor 19. The gate circuit 21, therefore, effectively blocks further signals from the particular channel 15 which has just operated and permits signals from the other detector channels 15′ to operate the trigger circuit 22. After the defect has passed, the capacitor 36 recharges through the bleeder resistor 40. Thus, a single counter 14 is capable of recording defects on a plurality of insulated wires provided a short time interval occurs between the leading ends of defects.

The recording apparatus 14 may comprise an electronic counter operating directly off the trigger circuit if it is desired to cut down the time lapse required between the initial detection of a first defect and the start of a subsequent defect. The time lapse should be minimized particularly where the insulating machines are running at high speed. The Schmitt trigger 22 may be designed to deliver a predetermined operate signal required by the selected type of counting means.

FIG. 3 illustrates another embodiment of the invention wherein the detecting apparatus is used to detect insulation faults occurring on a pair of twisted conductors 41. The individual conductors 10 are fed from a pair of supply reels 42 through a twisting bow 43 to a grounded take-up reel 44. A spring-loaded roller 45 contacts the twisted conductors 41 in order to detect bare wire defects. The roller 45 is maintained at a positive potential by the power supply 46 while the conductor pairs are connected through terminals on the take-up reel 44 to ground. Consequently, when the roller 45 encounters an insulation defect the capacitor 47 discharges through the conductor to ground. When the defect has passed the roller 45, the capacitor recharges causing a positive voltage surge which fires the trigger circuit 48.

The output from the trigger circuit 48 is fed to a single stage amplifier 49 which supplies an amplified signal to operate the relay 51. Relay contacts 52 in the motor control circuit stop the winding apparatus so that the defect can be corrected. FIG. 3 depicts a single detecting arrangement but it is to be understood that a plurality of detectors may be coupled to the trigger circuit 48 to record defects occurring on a plurality of twisted conductor pairs 41. The detecting apparatus may of course be used to detect insulation defects during a rewinding operation or at other stages in the manufacturing process. A counting means may also be provided similar to the arrangement disclosed in FIG. 2 in order to record a defect count. Furthermore, the circuit arrangement of FIGS. 1 and 2 could be used in the various manufacturing applications described with reference to the embodiment of FIG. 3.

FIG. 4 discloses a counting arrangement which records the total number of insulation defects and the number of defects per wire gauge occurring in the output from a plurality of pulp insulating machines.

When the relay 38, see FIG. 2, is operated by a defect signal from a particular detector the contacts 53 close registering the defect on the resettable counter 54 and sending a pulse through the diode 56 to the switching arrangement 57. For example, the resettable counter 54 could be one of a plurality of similar counters which feed the 19-gauge totalizing counter 60 from various pulp insulating machines. A wiper 58 in the switching arrangement 57 is connected to a designated output terminal 59 which is related to the wire gauge being run at the time. Each output terminal 59 is connected to a non-resettable counter 60 which totals the number of defects occurring on a particular wire gauge produced by a number of insulating apparatus. A wiper 61 is adjustably connected to one of a plurality of output terminals 62 to supply power to a designated indicating lamp 63. If a different wire gauge is to be run on an insulating apparatus the wipers 58 and 61 are merely moved to the output terminals 59 and 62 for the new wire gauge.

It is to be understood that the above-described arrangements are simple illustrative examples of the application of the principles of the invention. Numerous other arrangements may be readily devised by those skilled in the art, which will embody the principles of the invention and fall within the spirit and scope thereof.

What is claimed is:

1. An apparatus for detecting insulation defects in a plurality of insulated conductors comprising:
   a power supply,
   a plurality of detectors connected to the power supply, each monitoring an insulated conductor for insulation defects,
   means connected to the power supply for providing a reference potential for the conductors,
   a plurality of pulse generating means each responsive to detection of an insulation defect by a corresponding detector to produce an output pulse when the detector detects an insulating defect and engages a bared portion of the conductor, each pulse generating means including gating means for passing a pulse of a predetermined relatively short duration regardless of the length of the defect in the direction of the wire axis,
   a trigger circuit connected to each of the gating means and operable upon receiving a detector pulse to produce a defect signal,
   an amplifier connected to the output of the trigger circuit to amplify the defect signal, and a counter connected to the output amplifier for recording the number of defect signals.

2. An apparatus for detecting and counting insulation defects in a plurality of conductor comprising:
a power supply,
individual contact means connected to the power supply and being maintained in engagement with a particular insulated conductor,
a capacitor coupled to each contact means and being maintained in a charged condition by the power supply, said capacitor discharging through the contact means to a conductor maintained at a reference potential when the contact means engages a bare wire and remaining discharged as long as the bare wire defect is present,
a trigger circuit connected to the plurality of capacitors and operative upon receiving a defect signal of predetermined duration when one of the capacitors discharges,
an amplifier connected to the output of the trigger circuit to amplify the defect signal, and
a counter connected to the amplifier output for recording the number of successively occurring defect signals.

3. An apparatus for detecting and counting insulation defects in accordance with claim 2 including:
a relay coupled to the detector and operable upon de-detection of a defect to lock in through its contacts in an operative condition,
alarm means activated by the relay to remain in an operated condition until manually reset, and
circuit means for recharging a discharged capacitor when a defect is no longer detected by the contact means.

4. An apparatus for detecting insulation defects in a plurality of twisted pairs of conductors comprising:
a power supply,
individual spring-loaded contact means connected to the power supply and being maintained in engagement with a particular pair of conductors being fed to a take-up reel,
a capacitor coupled to each contact means and being maintained in a charged condition by the power supply, said capacitor discharging through the contact means to a conductor when the contact means engages a conductor portion having an insulation defect and recharging from the power supply when a defect is no longer present,
a trigger circuit connected to the plurality of capacitors and operative upon receiving a defect signal when a discharged capacitor recharges from the power supply,
an amplifier connected to the output of the trigger circuit to amplify the defect signal, and
a counter connected to the amplifier output for recording the number of successively occurring defect signals.

5. An apparatus in accordance with claim 4 including:
control means activated by a defect signal from the trigger circuit to stop the feed of a corresponding pair of conductors to a take-up reel.

6. An apparatus for detecting insulation defects in a plurality of conductors comprising:
a power supply,
a plurality of detectors connected to the power supply, each detector monitoring an individual conductor for insulation defects,
individual pulse generating means coupled to each detector and responsive to the detection of an insulation defect to produce an output signal of predetermined duration,
a trigger circuit connected in common to the individual pulse generating means and operable upon receiving an output signal therefrom for producing a defect signal,
amplifying means connected to the output of the trigger circuit to amplify the defect signals,
a counter connected to the amplifier output for recording the number of defect signals, and
each pulse generating means including means for generating only a single output signal on detection of a defect regardless of the length of the defect to enable any of the other pulse generating means to operate the trigger circuit immediately after the single output signal is generated and means for restoring the pulse generating means to normal when the defect has passed.

References Cited

UNITED STATES PATENTS

| 2,809,348 | 10/1957 | Kellogg et al. | 324—54 |
| 2,882,490 | 4/1959 | Sheets | 324—54 |
| 3,088,642 | 5/1963 | Kingsley | 226—43 |
| 3,156,863 | 11/1964 | Wakefield | 324—54 |

FOREIGN PATENTS 1,115,366 10/1961 Germany.

M. HENSON WOOD, JR., *Primary Examiner.*

ALLEN N. KNOWLES, *Examiner.*